United States Patent [19]
Lanker

[11] Patent Number: 5,343,973
[45] Date of Patent: Sep. 6, 1994

[54] LIGHTWEIGHT ELECTRIC VEHICLE

[76] Inventor: Willi Lanker, In der Gandstrasse 10, CH-8126 Zumikon, Switzerland

[21] Appl. No.: 634,219

[22] PCT Filed: Jun. 22, 1990

[86] PCT No.: PCT/CH90/00151
  § 371 Date: Feb. 4, 1991
  § 102(e) Date: Feb. 4, 1991

[30] Foreign Application Priority Data

Jun. 23, 1989 [CH] Switzerland .................. 02340/89-3

[51] Int. Cl.$^5$ .............................................. B62D 61/06
[52] U.S. Cl. ................................... 180/211; 180/312; 280/781
[58] Field of Search ............... 180/210, 211, 212, 214, 180/215, 216, 217, 213, 68.5, 311, 312; 280/795, 781; 296/185, 216, 218

[56] References Cited

U.S. PATENT DOCUMENTS

| | | | |
|---|---|---|---|
| 2,181,304 | 11/1939 | Lord | 180/68.5 |
| 2,514,056 | 7/1950 | Hatfield | 180/68.5 |
| 2,612,964 | 10/1952 | Hobbs | 280/781 |
| 3,940,162 | 2/1976 | Winslow et al. | 280/795 |
| 4,456,277 | 6/1984 | Carpenter | 180/215 |
| 4,484,648 | 11/1984 | Jephcott | 180/210 |
| 4,574,902 | 3/1986 | Irimajiri | 180/72 |
| 4,625,825 | 12/1986 | Ethier | 180/215 |
| 4,705,716 | 11/1987 | Tang | 296/185 |

FOREIGN PATENT DOCUMENTS

| | | | |
|---|---|---|---|
| 82288 | 3/1957 | Denmark | 180/210 |
| 0214372 | 11/1984 | European Pat. Off. | |
| 0184177 | 6/1986 | European Pat. Off. | |
| 340895 | 7/1904 | France | 180/210 |
| 51341 | 1/1942 | France | 180/210 |
| 972290 | 1/1951 | France | 180/216 |
| 1060325 | 4/1954 | France | |
| 1138186 | 6/1957 | France | |
| 2559119 | 8/1985 | France | |
| 210698 | 7/1940 | Switzerland | 180/210 |
| 90/03298 | 4/1990 | World Int. Prop. O. | 180/216 |

OTHER PUBLICATIONS

Automotive Engineering, vol. 93, No. 5, May 1985 (Warrendale, Pa.), p. 92.

Primary Examiner—Mitchell J. Hill
Assistant Examiner—Paul Dickson

[57] ABSTRACT

The lightweight electric vehicle comprising two front wheels and a rear wheel comprises a high-strength load-bearing chassis comprising a base, sides and bulkheads as a safety cell for the driver. A separate lightweight plastics body forms an aerodynamic tear drop-shaped outer skin. Both the body width of about 1 m and the chassis width of about 60 cm are very narrow. This gives high travel performance, minimal weight, air resistance and energy consumption. In addition, increased overall safety, good road holding and a high degree of manoeuvrability are obtained.

24 Claims, 6 Drawing Sheets

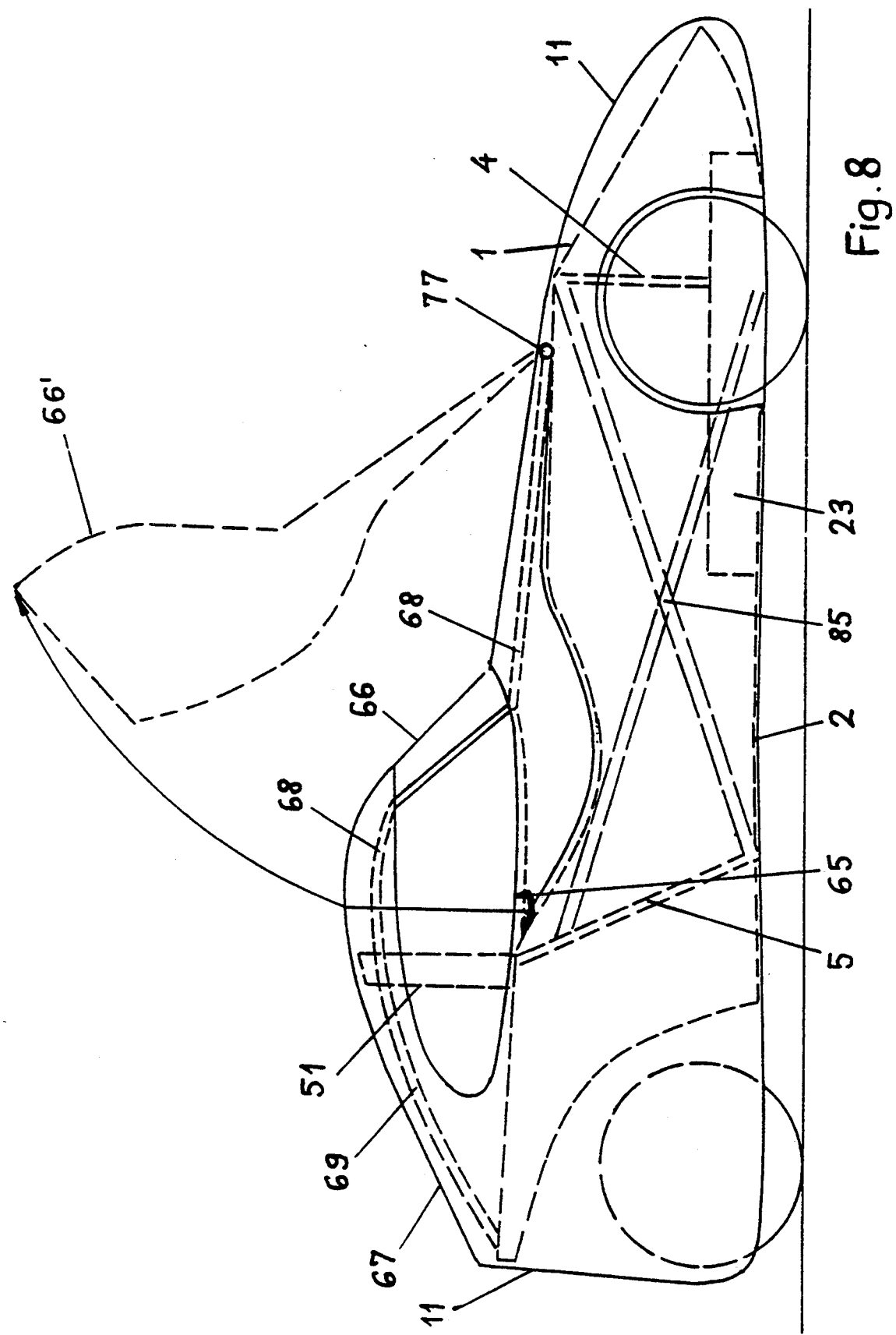

LIGHTWEIGHT ELECTRIC VEHICLE

The invention relates to a lightweight electric vehicle comprising two front wheels and one rear wheel. Vehicles of this kind have been known for many years in connection with solar-powered vehicle racing. An electric vehicle manufactured by Horlacher AG of Möhlin, and licensed for road traffic, comprises a self-supporting fibre-reinforced plastic body which at the same time forms the outer contour and has to take all the loading forces. To achieve adequate side stability and a low frontal area it has large-track free-standing front wheels. However, these could easily be overlooked in traffic and also give a relatively considerable vehicle width. The known lightweight vehicles still have a power consumption of at least 50 Wh/km at normal private car speeds of 80 km/h. Nor can they keep up in normal traffic, while as a result of their width they are not easy to overtake. Their overall safety is unsatisfactory as well. In addition, the low energy density of current batteries is a very considerable limitation to the possible travelling performance and range. Self-supporting plastic bodies are also known. For example, EP 0184 177 A3 discloses a relatively wide self-supporting body which is usable for electric vehicles and which consists of a non-reinforced plastics shell with integrated metal profiles, e.g. for use as a rubbish disposal vehicle. This construction, however, gives only low strength and it is unsuitable for fast electric vehicles.

It is therefore the object of this invention to provide a lightweight electric vehicle which can keep up with fast everyday traffic in regional areas without obstructing the traffic flow. More particularly, it should enable the single commuter to drive to work substantially Just as fast as with a car. At the same time, there should be minimum energy consumption and high overall safety, particularly in respect of less well protected traffic such as pedestrians, cyclists and children. Overall there should be a vastly improved combination cf the most important properties: travel performance, consumption, and hence high battery costs, overall safety and occupation of traffic area.

This problem is solved according to the invention, to which end the lightweight vehicle comprises a load-bearing narrow box-shaped or shell-shaped chassis having at least one front transverse connection and one rear transverse connection surrounding the driver in the form of a safety cell, the front wheels being situated outside the chassis. The vehicle also comprises a separate lightweight plastics body which forms an aerodynamic slender outer shape covering all the wheels while the chassis is of high-strength and rigid construction. This combination gives both a very low weight and low air resistance and hence minimal energy consumption and in turn reduced battery weight requirements. Owing to great manoeuvrability and its slender form, the vehicle can rapidly and in the smallest space avoid an impending collision (with a car or pedestrian). The narrow width, being by far the most important criterion in traffic area occupation, enables two vehicles according to the invention to be situated side by side on a normal traffic lane in principle. Thus the vehicle, while having the narrow traffic width of a powered cycle, reaches practically normal private car transportation speed. This means that the traffic area occupation is vastly reduced to about half. Overtaking is also facilitated and safer, both for faster cars and in cases in which the vehicle overtakes cyclists in two-way traffic. Thus mutual obstruction is greatly reduced. The amount of parking area required is less than hall that of a private car.

One of the advantages of the vehicle is that, a flat low-lying chassis base gives a very low centre of gravity with correspondingly good road holding. Preferably, the maximum width of the chassis can be not more than 70 cm (e.g. 60 to 65 cm) and the maximum width of the body, which is fully utilised by the front wheels, can be not more than 110 cm (e.g. even just 100 cm). The chassis can taper wedge-fashion forwardly and its base be raised at the front alter the style of a ski. Wheel suspensions outside the chassis and chassis fittings may have a lower strength than the chassis, e.g. in the form of intentional breakage points in the event of a heavy impact from the front. The outlying parts of the suspension and the side halves of a longitudinally divided body can then be torn away in the event of a collision and the chassis can slip through as a safety cell around the driver without any deformation and hence be braked slowly.

Plastics reinforced with industrial endless fibres such as carbon, aramid or glass can be used as high-strength lightweight materials for the safety chassis. Suitable plastics are duroplasts such as epoxy resins and polyesters or thermoplastics such as polyphenylensulfide (PPS), polyethersulfone (PES), polyetherimide (PEI), polysulfone (PSU), polypropylene (PP), polyamide (PA) and polyetheretherketone (PEEK). A very light and stiff chassis can be made from a sandwich with two high-strength top layers and an intermediate light supporting core of foam, honeycomb material or knitted fabric. For this purpose it is possible to convert panels thermally, for example, of tough polyvinylchloride (PVC) foam in a thickness of 1 to 2 cm and coat them with carbon-aramide (C-A) mixed fabrics and expoxy resin. The fibre reinforcement can be adapted to the loading by means of integrated carbon rovings in the form of a checkerwork so that the chassis is stiffened. A box shaped chassis can also be built up from aluminium honeycomb panels, e.g. Ciba AEROLAM aluminum honeycomb panels. Minimum air resistance coefficients and also small cress-sectional areas can be obtained by a tear drop-shaped construction of the body, both of the basic body and of the cockpit hood. A favourable and uniform weight distribution over all three wheels can be obtained by arranging the batteries in the area of the front wheels on the base of the chassis. Plastics such as polyurethane elastomers or carbon or glass reinforced plastics are suitable as simple and lightweight springing elements. Good travel and suspension properties can be obtained by multiple springing of the sub-masses comprising the chassis, battery and driver, this being possible with just small spring travels. A steering means disposed beneath the driver's legs with very direct steering transmission enables the vehicle to be steered and manoeuvred very rapidly and accurately. By combining the drive with a compound rear wheel swing arm and a spring support it is possible to form a very lightweight and compact unit. A very favourable power to weight ratio and high acceleration can be obtained with an infinitely variable automatic torque converter drive as explained, for example, in SSES Tagungsband: Solarfahrzeuge, Berne, 1985, page 129.

The invention is explained in detail hereinafter with reference to exemplified embodiments and drawings wherein:

FIG. 8 is an entry variant.

Figure 1A:
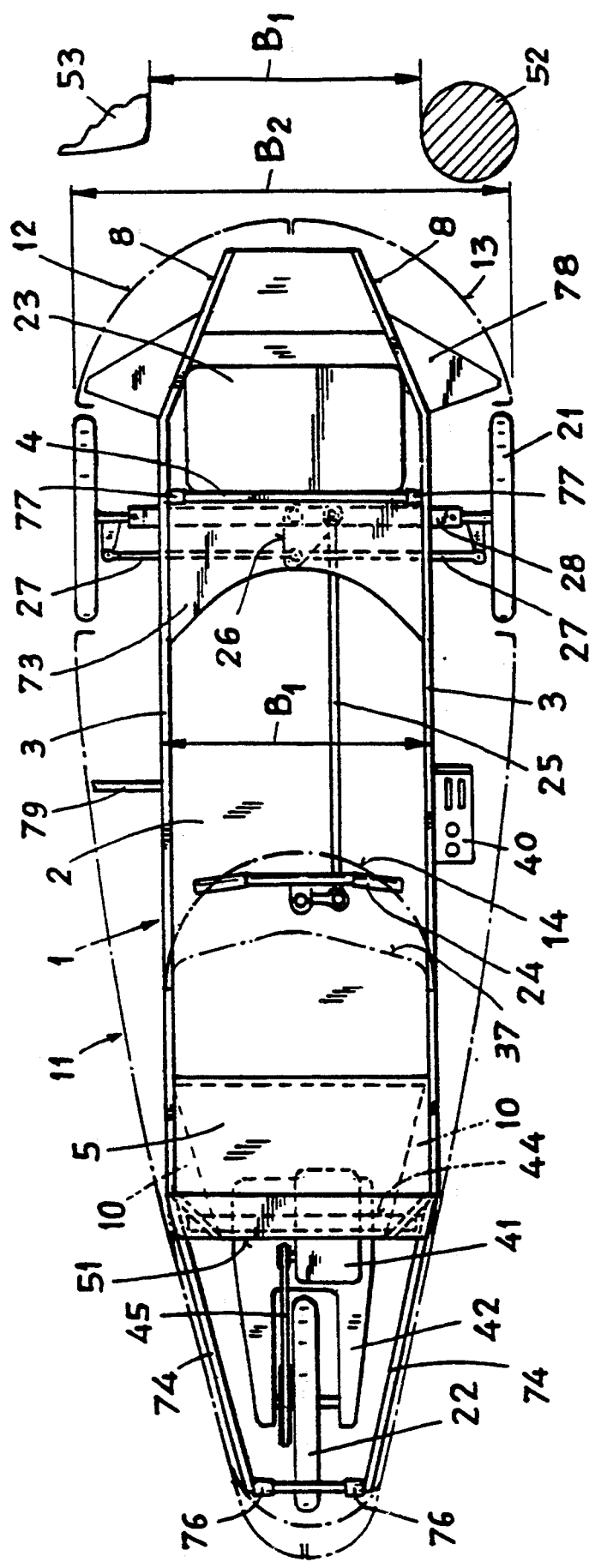
FIG. 1a illustrates a top view of a vehicle constructed in accordance with the invention.
Figure 1B:
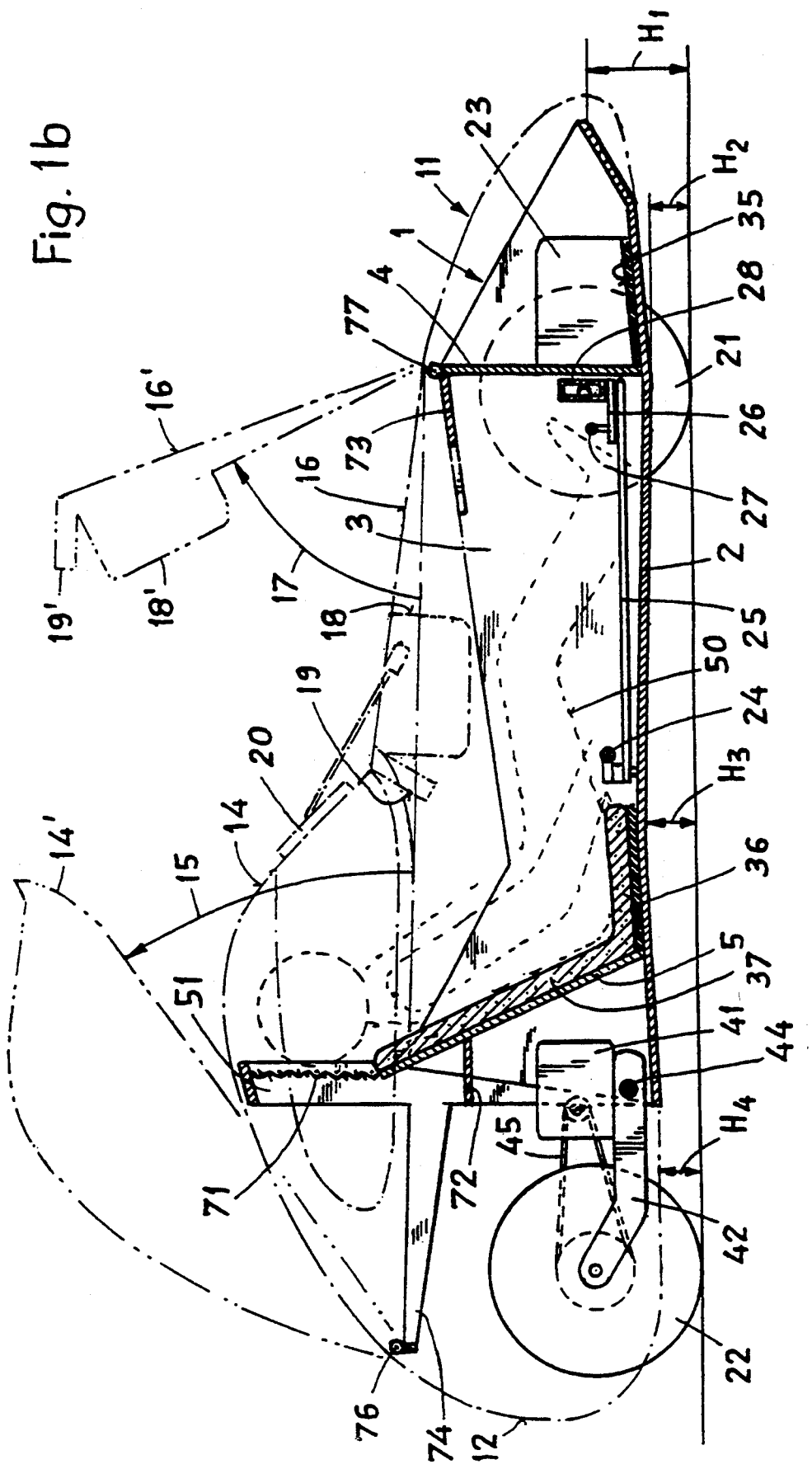
FIG. 1b illustrates a part cross-sectional view of a vehicle constructed in accordance with the invention.
Figure 1C:
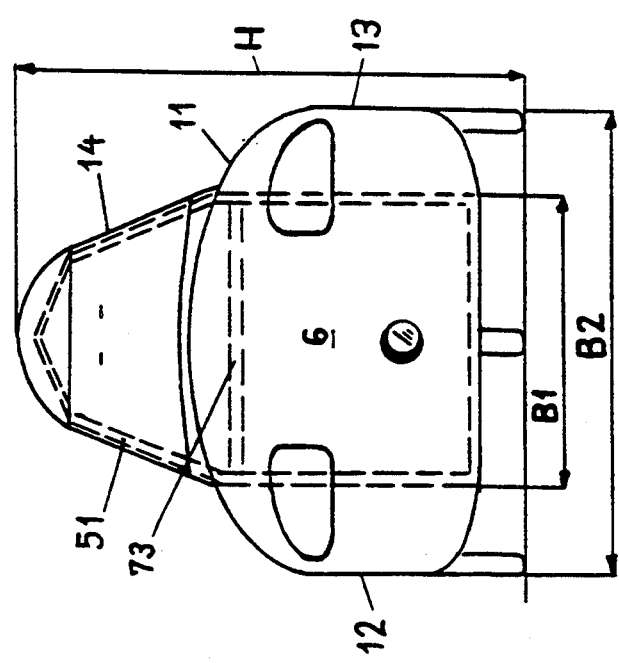
FIG. 1c illustrates a front view of a vehicle constructed in accordance with the invention.

A lightweight electric vehicle according to the invention is illustrated in three elevations in FIGS. 1a to c. A low-lying rigid box-shaped (i.e. shell-shaped) chassis 1 comprises a base 2, side walls 3 and stiffening transverse connections in the form of bulkheads 4 and 5 surrounding the driver 50. The front bulkhead 4 takes forces from the suspensions of the front wheels 21 and the battery 23. This bulkhead 4 also separates the driver interior 6 from a battery 23, this being desirable, for example, in the event of an accident. The rear bulkhead 5 takes the forces of the driver's weight, rear wheel suspension 42 and motor 41 and also acts as a backrest for a lightweight driver's seat 37, e.g. made of 1 mm thick aramid (KEVLAR) or glass-epoxy composite. Safety belts can also be supported on the rear bulkhead 5. A separate body 11 is supported on the chassis 1 and connected thereto, e.g. by silicone rubber or by screw connections. Both the basic body 11 and a cockpit hood 14 are tear drop-shaped and hence aerodynamically favourable. The side space between the chassis 1 and the body 11 can be used as a stowing area and for various installations, for example, an electric switchboard 40 (see FIG. 1a). The hood 14 can be swung up in the direction 15 (see FIG. 1b ) to a raised position 14' for alighting from the vehicle and is detachable for open driving. The vehicle can then be converted to a Spyder (open car) by means of a small windscreen and a cover behind the driver. A roll bar 51 is also integrated into the chassis 1. A net fixed in the roll bar acts as a head support 71. To facilitate entry, a cover 16 with a door cut-out 18 in front of the driver is disposed as part of the body to swing forwardly and up in the direction 17 (see FIG. 1b) to a raised position 16'. Cover 16 also carries a dashboard 19 and a windscreen wiper 20, which may be detachable and which are movable into raised positions 18', 19' with the cover 16'.

The body 11 may also be formed of one of a reinforced thermosetting plastics and a reinforced thermoplastics.

A top stiffener in the form of a transverse rib 72 at the rear and a deck stiffener 73 at the front serve for further reinforcement of the chassis. A rearward chassis extension 74 carries the hood 14 which is fixed on the chassis 1 by a pivot 76. The cover 16 is also fixed to the chassis via a pivot 77. External fittings can also be mounted on the chassis, e.g. wheel guards 78 or a body mounting 79 (see FIG. 1a), although their strength is less than that of the chassis itself.

Due to the small maximum width B2 of the body of about 1 m (e.g. 100 to 115 cm) and preferably not more than 110 centimeters as defined by the front wheels, and the even smaller width B1 of the chassis, the vehicle or its shell-shaped (i.e. box-shaped) safety cell chassis 1 can pass through a very narrow gap in the event of an impending collision. In the extreme case the chassis 1 can pass through a gap having a width B1 of 60–70 cm, e.g. between a tree 52 and an oncoming motor vehicle 53 (see FIG. 1a). The wheel suspensions and the bottom part of the body consisting of two halves 12, 13 (FIG. 1c) should be torn off in these conditions without any deformation of the chassis or injury to the driver. The cover and hood parts of the body above the chassis are rigidly connected thereto and reinforced so that they are not torn off. The base 2 of the chassis has varying heights. To obtain the lowest possible centre of gravity with adequate ground clearance, $H4 = 12$ cm, $H3 = 14$ cm and $H2 = 10$ cm for example. The front of the vehicle is raised after the style of a ski to $H1 = 25$ cm, thus allowing anything to slide over with the chassis nose even without the front wheels. The chassis has wedge-shaped tapers front (8) and rear (10).

Figure 7:
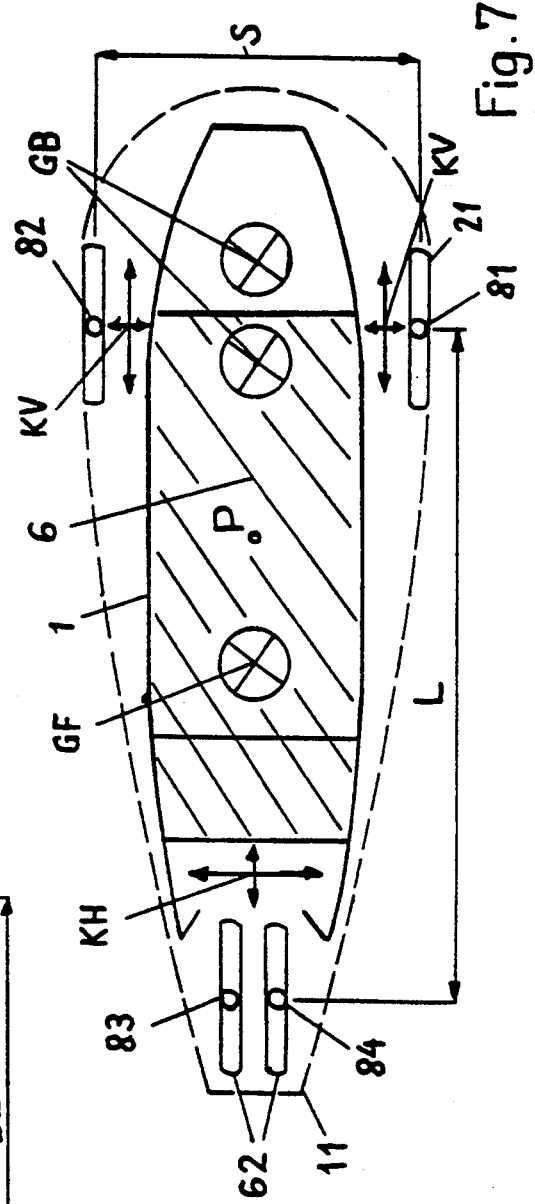
FIG. 7 shows the basic principle of the vehicle.

The schematic diagram in FIG. 7 illustrates the basic principle of the vehicle according to the invention. The narrow chassis:

1. takes all forces, i.e. forces of the front wheels and wheel suspensions KV, the forces of the rear wheels KH and the mass forces of the driver GF and battery GB and
2. at the same time forms a safety cell with an interior 6 (hatched) for the driver, of minimum dimensions, i.e. minimal width B1.

The rear wheel can also be constructed as a double wheel 62 (e.g. with a 10 cm spacing) without having an adverse effect on the aerodynamic shape of the body 11. It is important that all the wheels are situated with the points of support 81 and 82 at the front and 83, 84 rear, at the outermost boundary defined by the body, so that a large front track S, e.g. of 95 to 105 cm, a large wheel base L of, for example, 180–200 cm, and hence a large support surface and very good road holding can be obtained. The centre of gravity P, including the driver, is ideally about 30 to 35% of L behind the front axle.

Figure 2:
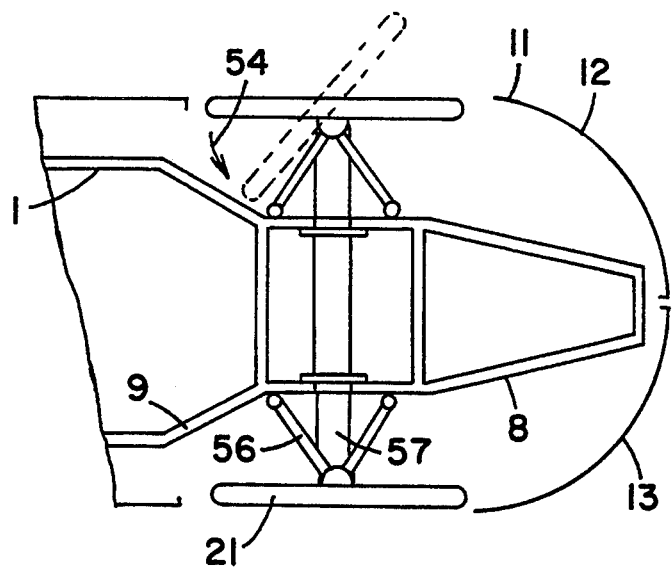
FIG. 2 is a variant with a tapered front.
Figure 5:
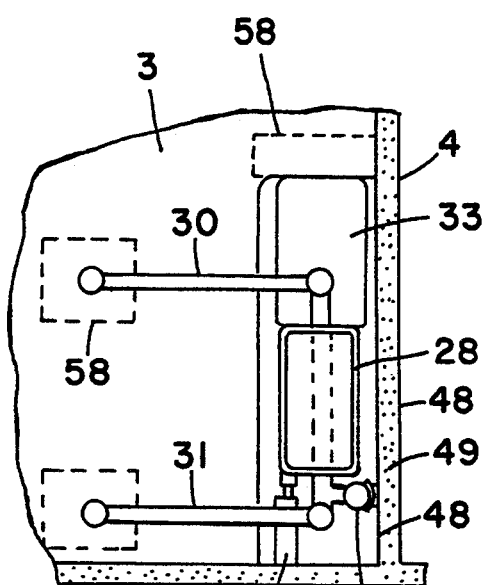
FIG. 5 is a front wheel suspension.

In another example shown in FIG. 2 the chassis has a first taper 9 to increase the toe-in 54 and to receive a wishbone suspension 56 and another front taper 8. Instead of double transverse wishbones it is also possible to combine an upper wishbone 56 with a bottom wheel-guiding fibre-reinforced transverse leaf spring 57. The forces of wheel suspensions with springs are in each case taken by reinforcing inserts in the chassis 1 (FIG. 5). The vehicle height H (see FIG. 1a) of about 1 to 1.1 m corresponds approximately to that of fast low-slung sports cars.

Figure 4:
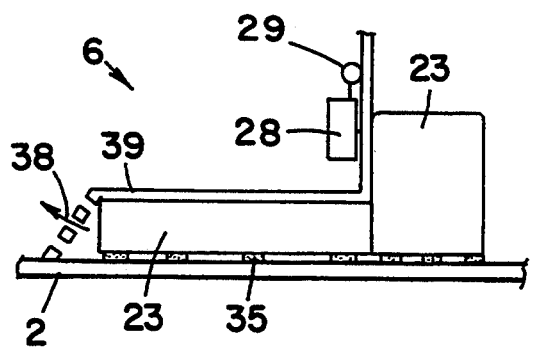
FIG. 4 is a variant of the battery arrangement.

As shown in FIGS. 1a and 1b, a steering means 24 after the style of a bicycle handlebar beneath the legs allows accurate rapid steering and avoids any steering wheel injury to the driver. It is also possible to slide across the steering means and pull in the head so that the entire person is protected by the front bulkhead 4, which has a height of 45 to 55 cm. The steering means 24 actuates track rods 27 of the front wheels 21 (see FIG. 1a) via a steering rod 25 and a guide lever 26. As shown further in FIG. 5, the vehicle of FIG. 1 has a rigid front axle consisting of a lightweight aluminium rectangular profile tube 28 with a pair of longitudinal links 30, 31 and one transverse link 29. The suspension forces are transmitted to the chassis by reinforcements 58. The transverse link 29 can be disposed relatively high up above the front axle tube (FIG. 4) substantially at the height of the overall centre of gravity, including the driver, thus giving a stabilizer effect and greatly reducing inclination on curves. A lightweight plastics element 33 made of polyurethane foam elastomer or a unidirecctional fiber composite material acts as a spring, complemented by a hydraulic shock absorber 32 weighing only 90 g.

Figure 6:
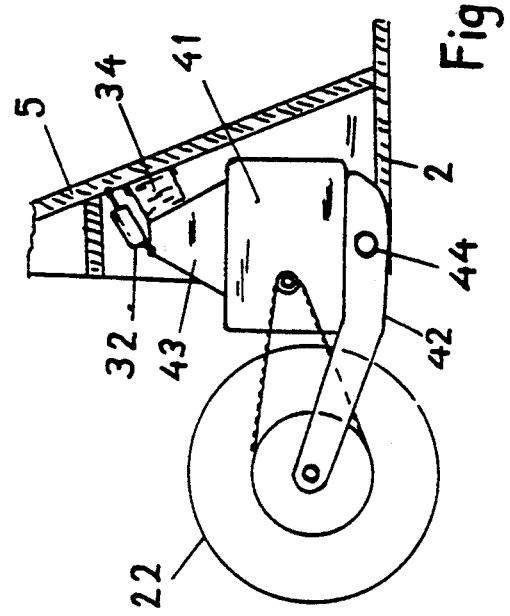
FIG. 6 is a rear wheel swing arm with drive.

Similarly, the rear wheel suspension of FIG. 6 is supported on the back wall 5 via a polyurethane spring element 34 and a shock absorber 32. The swing arm 42 of the rear wheel 22 consisting of C-reinforced sandwich composite plastic is bent so that the drive unit 41 resting thereon together with the integrated spring support 43 comes to lie at a low level. The drive centre of gravity is directly above a hollow shaft 44 mounted in the chassis as an axis of rotation and as close as possible thereto. As indicated in FIGS. 1a and 1b, the rear wheel 22 is driven by the drive unit 41 via a belt transmission 45. To improve traction, the two front wheels 21 can each be driven by a lightweight motor 91 (FIG. 2).

Figure 3:
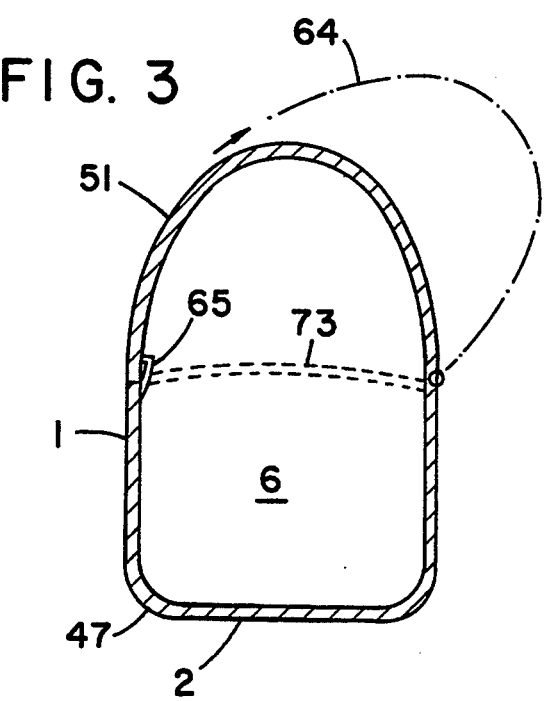
FIG. 3 is a chassis cross-section in the form of a shell.
Figure 3A:
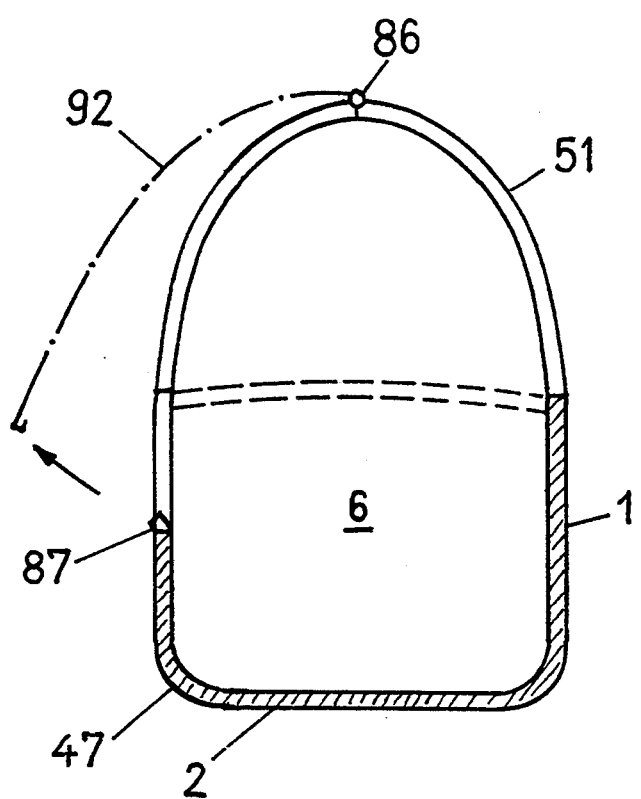
FIG. 3a illustrates a cross-sectional view of a laterally opening hood in accordance with the invention.

A shell-shaped chassis 47 shown in cross-section in FIG. 3 comprises a partially closed profile with a roll bar 51 and front top reinforcement 73 which further increase the strength and rigidity of the safety cell. For entry purposes, the hood 64 fixed on the chassis can in this case be swung up laterally over the roll bar via a suitable pivot. In the closed state the hood 64 is locked on the chassis (by a lock 65 as above). A lateral body door 92 (see FIG. 3a) can also be articulated at the top of the bar 51 at place 86 and extend down as far as place 87.

FIG. 5 shows a sandwich composite chassis construction. It consists of two high-strength fibre reinforced covering layers 48 on a lightweight support core 49, e.g. of foam or aramid honeycomb fabric NOMEX. Each layer 48 may be made of thermoplastic of thermosetting plastics reinforced with industrial endless fibers, such as carbon, aramid or glass. Aluminum honeycomb sandwich panels AEROLAM are also suitable and give high rigidity. Very good mechanical properties with optimum shaping and manufacturing processes are obtained with fibre-reinforced thermoplastics, particularly in sandwich form. The chassis 1 may also have reinforcements forming a checkerwork with the front transverse connection (bulkhead) 4 and the rear transverse connection (bulkhead) 5 with the reinforcements being integrated in plastics and consisting of unidirectional carbon strips. In principle it is also possible to form a tubular frame checkerwork combined with panels, e.g. at least one base panel, but this gives less satisfactory mechanical properties than the genuine shell construction. Instead of bulkheads, the transverse connections may, for example, also consist of profiles. Very lightweight bodies can also be constructed from fibre-reinforced thermosetting plastics or thermoplastics, specially with aramid or glass reinforcement. The necessary shape rigidity, particularly in flat zones, can be obtained by means of ribbing or sandwich construction, e.g. two 0.5 mm thick aramid top layers on a 5 mm thick light foam core.

To obtain optimum uniform weight distribution, the batteries 23 are disposed in the region of the front wheels and are low-lying. In another example of the battery arrangement shown in FIG. 4, part of the battery 23 is situated in front of the front bulkhead 4 and part behind the bulkhead 4 flat on the chassis base 2 separated by a second base 39 from the driver's space. In accordance with requirements, the batteries can be insulated or aerated (38). Good travel properties can also be obtained by multiple springing of the individual masses (e.g. empty vehicle 70 kg, batteries 50 kg, driver 70 kg). In that case, in addition to the vehicle supension, the batteries 23 and the driver's seat 37 are also sprung and damped vertically, e.g. by polyurethane (PUR) foam elements 1 cm thick 35, 36 (FIG. 1b).

FIG. 8 shows another variant with a swing-up cover part 66 with an integrated front screen and a hood front part as an entry opening. This cover part 68 has a reinforcement 68 and is connected to the chassis 1 so as to pivot about a strong pivot 77. The rear hood part 67 is also reinforced by a reinforcement 69 and rigidly connected to the chassis 1 and roll bar 51. In the closed state, the cover part 66 is locked on the chassis (as above). The chassis is additionally reinforced by an integrated carbon fibre checkerwork 85 (see FIG. 8).

With a vehicle constructed in accordance with the invention, it is possible to achieve a top speed of 90 to 100 km/h, a speed of 50 km/h on 8% gradients, a range of 50 to 60 km and a consumption of only 25 Wh/km (at 80 km/h) using current standard batteries (e.g. with 50 kg nickel cadmium (NC) cells, type RSH 7 amps made by the company Varta, and automatic converter drive, RS 2000 manufactured by Delta AG, Solothurn, of 3 kw power at 60 V, the unladen vehicle weight without batteries being 70 to 80 kg. Thus, it is possible for a commuter to reach his workplace just as quickly as with a car. With lighter weight batteries under development, e.g. nickel hydride or lithium polymer batteries or accumulators, the powers, weight and particularly the range of the vehicle according to the invention will be greatly improved In the future. Fuel cells with associated fuel can also be used as electric storage means. Although primarily designed as a single-seater, the design according to the invention includes an emergency seat in the form of a pillion behind the driver (with correspondingly slighly enlarged track and wheel base).

Designed as a single-seater, i.e. always occupied by just one person, the laden weight is substantially fixed with just minor variations of from 5 to 10%. Thus, the track and wheel base can be selected to the optimum values, the running gear and suspension characteristics can be set very accurately and to the optimal values, thus giving an above-average good road holding and a high degree of safety in conjunction with the low weight. Safety is increased by readily visible striking colours. Grey would not be suitable, nor is it in keeping with the character of the vehicle.

I claim:
1. A lightweight electric vehicle comprising
   a load-bearing narrow shell-shaped chassis of high-strength rigid construction forming a safety cell for surrounding a driver, said chassis having a pair of coextensive side walls, at least one front transverse connection connected to and between said side walls and one rear transverse connection connected to and between said side walls, each said side wall extending upwardly to maintain the body of a driver between said side walls;
   a pair of front wheels connected to and situated outside said chassis;
   at least one rear wheel connected to said chassis; and
   a separate light-weight plastics body of an aerodynamic slender tear-drop outer shape covering all said wheels and said chassis.
2. An electric vehicle according to claim 1 wherein said at least one rear wheel is a double wheel.
3. An electric vehicle according to claim 1, wherein said chassis has a flat base.

4. An electric vehicle according to claim 1, characterized in that the maximum width of said chassis is not more than 70 cm and the maximum width of the body is not more than 110 cm.

5. An electric vehicle according to claim 1 wherein said front wheels are disposed at the respective, outermost side edges of said body an dsaid at least one rear wheel is at the outermost edge of said body at the rear.

6. An electric vehicle according to claim 1 further comprising a roll bar integrated into said chassis.

7. An electric vehicle according to claim 1 wherein said body is reinforced in at least one part covering said chassis and is connected to said chassis.

8. An electric vehicle according to claim 1, characterized by a chassis of high-strength lightweight material selected from one of thermoplastics and thermosetting plastics reinforced with industrial endless fibres.

9. An electric vehicle according to claim 1, characterized in that said chassis consists of a sandwich of two high-strength top layers with an interposed lightweight core.

10. An electric vehicle according to claim 1, characterized in that said body consists of one of a reinforced thermosetting plastics and a reinforced thermoplastics.

11. An electric vehicle according to claim 1, characterised in that said body comprises two longitudinally divided lateral halves, a cover and a removable hood.

12. An electric vehicle according to claim 1, characterised in that said body comprises a tear drop-shaped basic member and a tear drop-shaped hood.

13. An electric vehicle according to claim 1 which further comprises a hood pivotally mounted on said plastic body to provide access to said shell-shaped chassis.

14. An electric vehicle according to claim 13 which further comprises a cover part pivotally mounted on said chassis to pivot in an upward direction away from said hood.

15. An electric vehicle according to claim 13 wherein said hood pivots laterally of said body.

16. An electric vehicle according to claim 1 which further comprises wheel guards and body mountings on said body outside said chassis with a lower strength than said chassis.

17. An electric vehicle according to claim 1 which further comprises batteries in a space between said front wheels and said front transverse connection.

18. An electric vehicle according to claim 17 which further comprises a plastic spring between said chassis and at least one of said wheels and between said batteries and said chassis.

19. An electric vehicle according to claim 1 which further comprises a plastic spring between said chassis and at least one of said wheels.

20. An electric vehicle according to claim 1 which further comprises a steering means in a bottom of said chassis for disposition under a driver's legs, said steering means being connected to said front wheels.

21. An electric vehicle according to claim 1 which further comprises a drive for driving said rear wheel, a swing arm secured to said chassis and having said drive and said rear wheel mounted thereon, and a spring support connected to and between said chassis and said drive.

22. An electric vehicle according to claim 1 which further comprises an infinitely variable automatic torque converter drive connected to said rear wheel.

23. A lightweight electric vehicle comprising
a narrow load-bearing shell-shaped chassis of high-strength rigid construction for receiving a driver, said chassis having a front bulkhead at a forward end, a rear bulkhead at a rear end for supporting a driver, and a pair of side walls extending between said bulkheads, each said side wall extending upwardly to maintain the body of a driver between said side walls;
a pair of front wheels mounted on said chassis near said front bulkhead and located laterally outside said chassis;
at least one rear wheel mounted on said chassis near said rear transverse connection; and
a lightweight body having an aerodynamic slender tear-drop shape covering at least said front wheels and said rear wheel.

24. An electric vehicle as set forth in claim 23 which further comprises a steering means in said chassis connected to said front wheels to steer said front wheels.

* * * * *